Dec. 12, 1933.    L. GILMAN    1,938,899
ELECTRICAL CONTROL APPARATUS
Filed Jan. 4, 1933    5 Sheets-Sheet 1

Dec. 12, 1933.   L. GILMAN   1,938,899

ELECTRICAL CONTROL APPARATUS

Filed Jan. 4, 1933   5 Sheets-Sheet 3

INVENTOR=
Louis Gilman
By Geo. R. Woodworth
ATTORNEY=

Dec. 12, 1933.   L. GILMAN   1,938,899
ELECTRICAL CONTROL APPARATUS
Filed Jan. 4, 1933   5 Sheets-Sheet 5

Fig. 9.

Patented Dec. 12, 1933

1,938,899

UNITED STATES PATENT OFFICE 1,938,899

ELECTRICAL CONTROL APPARATUS

Louis Gilman, Chelsea, Mass.

Application January 4, 1933. Serial No. 650,116

13 Claims. (Cl. 178—33)

This invention relates to electrical control apparatus and more especially to apparatus for effecting distant electrical control and while the principle underlying the invention is disclosed in connection with a radio printing telegraph, the invention is capable of more general application and can be used for controlling other types of distantly-located mechanisms such as airplanes, torpedoes and the like.

My invention involves the interposition between several frequency-responsive elements and the device to be controlled of a system of linkage so arranged as to modify the effect on said device of the motion of the instrumentalities selected by said frequency-responsive elements in accordance with the particular element or combination of elements energized by the received impulses.

Various arrangements of linkage systems may be interposed between the frequency-responsive elements and the device to be controlled for the purpose of securing the necessary movement of the selector element associated with such device.

One embodiment of my invention contemplates the use of a plurality of electromagnets controlled by said frequency-responsive elements, and a series of links, the first link pivotally connecting the armatures of the first two electromagnets, the second link pivotally connecting the armature of the third electromagnet with the link first mentioned and the following links, respectively, pivotally connecting the armatures of their magnets with the link immediately preceding. The pivotal connection of each link to the preceding link is made at a point such that the ratio of the lengths into which any link is divided by such connection is in general different from the ratio of the lengths of the parts into which any other link is divided by the pivotal connection thereto of the link immediately following.

By properly proportioning the said ratios the desired movement of the selector element may be obtained by the energization of a predetermined magnet or combination of magnets.

In another embodiment of my invention the desired selection is obtained by levers of progressively different lengths, each connected to the armature of one of the electromagnets and said levers are connected each to the one next following by links which divide said levers into two parts, the ratios of the lengths of which parts preferably are unity.

In another form of the invention the magnets are so arranged that the amplitude of their armature movements progressively increase in a definite ratio as for example 1:2:4:8, and in such case the armatures of the first pair of magnets are pivotally connected by a link, the armatures of the second pair of magnets are pivotally connected by a link and the said links are pivotally connected by a third link at points preferably midway between the ends of the first-mentioned links, while the selector element is pivotally connected to the link last-mentioned, preferably at the middle thereof.

While the disclosure is made in connection with a radio system, it will be obvious that it is applicable to systems involving wires connecting the transmitting and receiving stations. If used in connection with a radio or other system subject to static interference, it is highly desirable that means be provided for preventing the closure of the circuit of the actuating mechanism which cooperates with the member controlled by the mechanism selected by the frequency-responsive elements when all of said elements are energized, as by a static crash. My invention accordingly contemplates an arrangement of circuits whereby the energization of all of said members will render the energization of such actuating mechanism impossible and whereby the same will be actuated only when one or more of such members in a plurality of sets are energized.

In the drawings which accompany and form a part of this specification—

In the particular drawings selected for disclosing the principle of my invention 1, 2, 3 and 4 are generators of different frequencies, for example, oscillators electrically connected to an electromagnetic wave transmitter 5 and arranged for actuation by the circuit closers 6, 7, 8, 9, 10, 11, 12, 13, 14, 15, 16, 17, 18, 19, 20 representing, in the present instance, the letters of the alphabet indicated above the same, said circuit closers being arranged to co-operate with the wires 21, 22, 23, 24 connected, respectively, with the oscillators 1, 2, 3, 4 and thereby close the circuits of said oscillators through the common conductor 25 and source of electrical energy 26.

At the receiving station frequency-responsive elements such as the filters 1', 2', 3', 4' are suitably connected to an electromagnetic-wave-receiving system 27 and said filters are connected by the wires 28, 29, 30, 31 and the common conductor 32 with electromagnetically-operable mechanisms, such as the electromagnets 1'', 2'', 3'' and 4''.

It is to be understood of course that while I have shown the transmitter 5 and receiver 27 connected, respectively, to the antennæ 33, 34, my invention is not limited to a radio system and is applicable to a system in which electrical impulses of different frequencies are transmitted over land wires.

The selector 35 is represented herein as a lever pivoted at 36 and provided at its free end with a plate 37 disposed for co-operation with the type 38 corresponding, respectively, with the letters carried by the circuit closers or keys at the transmitting station. When the selector has been placed in the desired position an imprint of the selected type is made on a sheet or strip of paper by mechanism well understood by those skilled in the art and which, not forming part of my invention, requires no description herein.

The movement of the selector into the desired position is controlled by a system of linkage connecting said selector and the armatures 1''', 2''', 3''' and 4''' of the electromagnets above-mentioned. Said electromagnets are energized by the currents passing through the filters and the energization of said filters is controlled by said circuit closers or combinations thereof, there being in the present instance fifteen such combinations corresponding, respectively, to the first fifteen letters of the alphabet. The key 6 which in the illustrated embodiment of the invention carries the letter O effects the energization of the oscillator 1 and causes the selector to move unit distance along the type platen at the receiving station until it is over the type carrying the letter O. The key 7 which carries the letter N closes the circuit of the oscillator 2 and causes the selector to move two units of length until it is over the letter N at the receiving station. The key 9 which carries the letter L closes the circuit of the oscillator 3 and causes the selector to move four units until it is over the letter L. The key H closes the circuit of oscillator 4 and causes the selector to move eight units until it is over the letter H. If there were a fifth oscillator, the energization thereof would cause the selector to move sixteen units and the energization of a sixth oscillator would effect a movement of the selector over thirty-two units. Thus it will be seen that the linkage interposed between the selector and the electromagnets at the receiving station cause the latter to effect movements of the selector which increase progressively in the ratios 1:2:4:8:16:32, etc., as said magnets are energized individually and progressively,—in other words, matters are so arranged that the distances travelled by the selector increase in geometric progression when certain keys at the transmitting station are operated singly and progressively. By operating the keys two at a time, three at a time and four at a time, various other movements of the selector throughout the range of the type platen are effected. All the embodiments of the present invention are based upon this principle.

In each of the embodiments of the invention the linkage which is interposed between the selector and the electromagnetically operable mechanisms which move the former to predetermined positions is so arranged that the effect of the motion of said mechanisms on the selector is modified in accordance with the particular electromagnet or combinations of electromagnets energized, and said electromagnets are energized in accordance with the particular frequency-responsive element or combinations of the same which are energized by the receiver 27.

Figures 1, 2, 3:
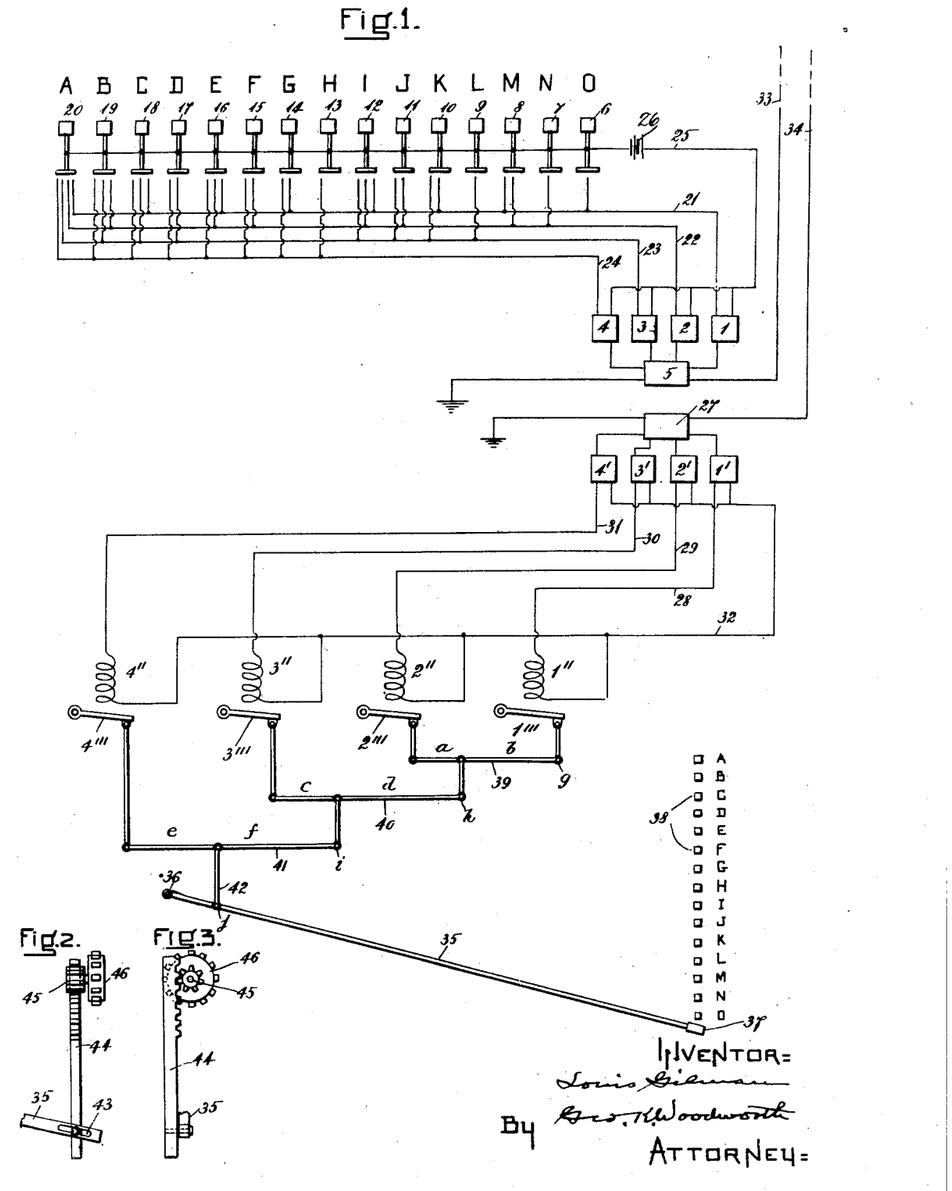
Figure 1 is a diagram of a radio printing telegraph system embodying my invention.
Fig. 2 is a plan view of a detail of construction.
Fig. 3 is a side view of said detail.

Specifically, in the form of the invention shown in Fig. 1, the link 39 pivotally connects the armatures of the magnets 1'' and 2'', the link 40 pivotally connects the armature of the magnet 3'' with said link 39 at a point intermediate the ends of the latter, the link 41 pivotally connects the armature of the magnet 4'' with the link 40 at a point intermediate the ends thereof, and the selector 35 is connected pivotally by the link 42 articulated thereto near its pivot 36 to the link 41 between the ends thereof. The point of connection of any link to the link next preceding divides the latter into two parts such that the ratio of the lengths of said parts of any link is different from the ratio of the lengths of said parts of any other link, and the point of connection of the selector to the link 41 divides the latter into two parts such that the ratio of the lengths of said parts of said third link is different from the ratio of the lengths of said parts of any other link. This proportioning of ratios is applicable to all embodiments of my invention in which the armatures of the electromagnets have the same amplitude of movement but, as hereinafter more fully set forth, it is possible to arrange said armatures to have different amplitudes of movement, in which case all the ratios aforesaid are equal to unity.

The lengths of the parts into which each link is divided by the pivotal connection thereto of the adjacent link are indicated by $a, b, c, d, e, f$. In the present instance $a/b = \frac{1}{2}$; $c/d = \frac{3}{4}$; $e/f = \frac{7}{8}$. Thus link 40 is pivotally connected to link 39 at a point dividing the latter into two parts, the ratio of the length of which is $a/b$. The link 41 is pivotally connected to the link 40 at a point dividing the latter into two parts, the ratio of the lengths of which is $c/d$ where $$c = \frac{2(a+b)+1}{2} - \frac{1}{2}$$

and $$d = \frac{2(a+b)+1}{2} + \frac{1}{2}$$

The pivotal connection of the selector to the link 41 divides the latter into two parts, the ratio of the lengths of which is $e/f$ where $$e = \frac{2(c+d)+1}{2} - \frac{1}{2}$$

and $$f = \frac{2(c+d)+1}{2} + \frac{1}{2}$$

The general rule is that the connection of each link to the link preceding divides the latter into two parts, the ratio of the lengths of which is $m/n$ where $$m = \frac{2(o+p)+1}{2} - \frac{1}{2}$$

and $$n = \frac{2(o+p)+1}{2} + \frac{1}{2}$$

and $o/p$ is the ratio of the lengths of the parts into which the preceding link is divided by the pivotal attachment thereto of the link next following.

The fifteen combinations are the combinations of four things taken one at a time which is equal to four: the combinations of four things taken two at a time which is equal to six: the combinations of four things taken three at a time which is equal to four: and the combinations of four things taken four at a time which is equal to one.

As above stated the keys 6, 7, 9 and 10 are connected each to a different one of the oscillator leads, key 6 to lead 21, key 7 to lead 22, key 9 to lead 23 and key 13 to lead 24.

The closure of key 6 effecting, as aforesaid, the energization of oscillator 1 results in the transmission, in the present instance, of electromagnetic waves having an audio-frequency that will be passed by the filter 1' only. Said electromagnetic waves radiated by the antenna 33 create in the antenna 34 oscillations having the said audio-frequency to which filter 1' is responsive. The current passed by said filter 1' actuates the armature 1''', the amplitude of movement of which is $r$. The ratio $a/b$ being equal to $\frac{1}{2}$, it follows that if the point $g$ rises a distance equal to $r$, the point $h$ will rise $\frac{1}{3}r$, the point $i$ will rise a distance equal to $\frac{1}{3} \times 3/7r$ and the point $j$ will rise a distance equal to $\frac{1}{3} \times 3/7 \times 7/15r = 1/15r$. By suitably placing the point of attachment of the link 42 with the selector, the free end 37 of the latter may be made to assume a position over the type O when the armature 1''' only is energized.

The closure of the key 7 and the resulting energization of magnet 2'' at the receiving station causes the point $h$ to rise $\frac{2}{3}r$, the point $i$ to rise $\frac{2}{3} \times 3/7r$ and the point $j$ to rise $\frac{2}{3} \times 3/7 \times 7/15r = 2/15r$, whereupon the selector moves two units to the type $n$.

The closure of the key 9 and the resulting movement of armature 3''' over a distance $r$, causes the point $i$ to move $4/7r$ and the point $j$ to move $4/7 \times 7/15 = 4/15r$, so that the end 37 of the selector will move four units to the type L.

The closure of the key 13 and the resulting movement of the armature 4''' will cause the point $j$ to move $8/15r$ and the end of the selector to move eight units to the letter H.

It will be readily understood from the foregoing specific description that by actuating various combinations of keys the selector may be moved over the other letters on the type platen and that by the simple expedient of adding a fifth oscillator, a fifth filter and a fifth magnet, the armature of which is pivotally linked to the preceding link 41, the selector of course being pivotally connected to the added link, the number of combinations possible will be twice fifteen plus one, or thirty-one, and that by adding a sixth set of units, the number of selections will be twice thirty-one plus one, or sixty three, and so on.

The several combinations of keys and oscillators above-mentioned are (using numbers applied to the oscillators) 1, 2 which selects the letter M, 1, 3 which selects the letter K, 1, 4 which selects the letter G, 2 and 3 which selects the letter J, 2, 4 which selects the letter F, 3, 4 which selects the letter D, 1, 2, 3 which selects the letter I, 1, 2, 4 which selects the letter E, 1, 3, 4 which selects the letter C, 2, 3, 4 which selects the letter B, and 1, 2, 3, 4 which selects the letter A.

The manner in which the actuation of said combinations of oscillators and the energization of the corresponding combinations of electromagnets 1'', 2'', 3'', 4'' effects the desired movement of the selector 35 will, it is thought, be apparent from the following example, viz, the closure of key 18 carrying the letter C effecting the operation of oscillators 1, 3 and 4 will cause each armature 1''', 3''' and 4''' to move a distance $r$ and the end of the selector to move thirteen units to the letter C, because of the proportioning of the ratios of the lengths of the parts into which the several links are divided by the pivotal connection to each of the links next following.

When the end of link 39 moves through the distance $r$, point $h$ moves $\frac{1}{3}r$ and point $i$ moves $\frac{1}{3} \times 3/7r = 1/7r$. The movement of armature 3''' a distance $r$ will cause the point $i$ to move $4/7r$, but as said point has already been moved $1/7r$ by the armature 1''', said movement of said armature 3''' in conjunction with the movement of armature 1''', will result in a movement of point $i$ a distance equal to $1/7r + 4/7r = 5/7r$. The movement of the point $i$ a distance of $5/7r$ will cause the point $j$ to move $5/7 \times 7/15r = 5/15r$. The movement of armature 4''' a distance $r$ will move said point $i$ a distance of $8/15r$, but as said point has already been moved $5/15r$ by the conjoint action of armatures 1''' and 3''', the total movement of said point effected by the armatures 1''' and 3''' in conjunction with armature 4''' will be $5/15r + 8/15r = 13/15r$.

Instead of moving the selector with respect to the type platen, mechanism may be provided whereby said selector rotates a type wheel with respect to the paper which is to receive the imprint of the selected type, or to actuate other mechanisms. Thus, in Figs. 2 and 3 I have shown the selector connected by the pin-and-slot 43 to the rack 44 with which meshes the pinion 45 rigidly connected with the type wheel 46. It will be obvious that any desired mechanism for effecting the movement by the selector of a type wheel or other device such as the control of any mechanism located distantly from the transmitter is within the purview of my invention.

Figure 4:
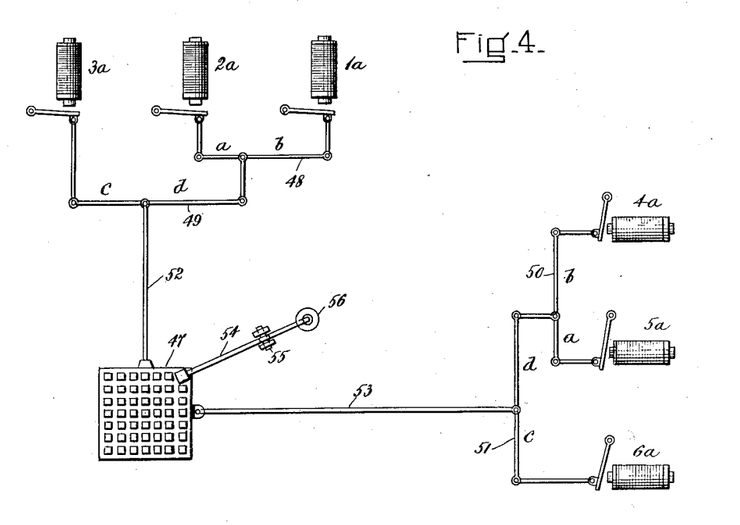
Figs. 4 and 5 are fragmentary views of modifications in which the mechanism controlled is arranged for movement by the conjoint action of two selector elements.
Figure 5:
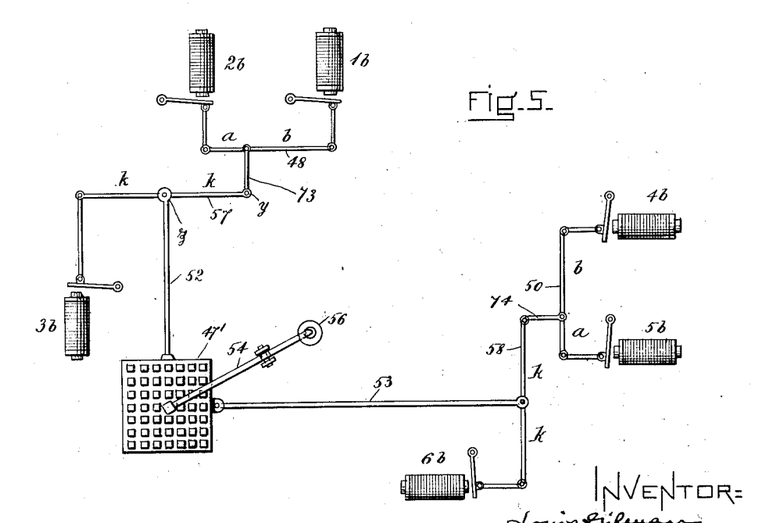

In Figs. 4 and 5 I show variants of the system described in connection with Fig. 1 involving two selector elements by the conjoint action of which a type platen or other mechanism is moved into selected position.

In Fig. 4 the magnets $1a$, $2a$, $3a$ are arranged in substantial parallelism and are all directed toward the platen 47. A second set of magnets $4a$, $5a$, $6a$ substantially in parallelism with each other are disposed in quadrature with respect to the first set. The armatures of the magnets $1a$, $2a$ are pivotally connected by the link 48 and the armature of the magnet $3a$ is pivotally connected by the link 49 to the link 48. In like manner the armatures of the first two magnets of the second set are pivotally connected by the link 50 and a second link 51 pivotally connects the armature of the third electromagnet of the second set with the link 50. The ratios of the lengths of the parts into which the links are divided by the pivotal connection thereto of the preceding links and the pivotal connections thereto of the selector elements 52, 53 are as above set forth in connection with Fig. 1. The selector element 52 preferably is rigidly connected to the platen and the selector element 53 substantially at right angles to the selector element 52 preferably is pivotally connected to the platen. The striker 54 pivoted at 55 is arranged to be actuated by the electromagnet 56 when the platen has been placed in predetermined or selected position. In the present instance the platen is provided with six rows of type characters having seven such characters in each row and one row of six characters with a blank at the upper righthand corner of the platen on which blank the striker rests when the platen is in normal position.

In Fig. 5 there are two sets of electromagnets arranged substantially in quadrature, the first set consisting of the magnets $1b$, $2b$ placed side by side and extending toward the platen, and a third oppositely-disposed magnet $3b$ extending away from the platen, and the second set consisting of the magnets $4b$, $5b$, $6b$ arranged, respectively, at right angles substantially to the magnets $1b$, $2b$ and $3b$, respectively. In this case the blank is at the center of the platen and the striker rests when the platen is in normal position on said blank. The ratio $a/b$ of the lengths of the parts into which the links 48, 50 are divided is 1:2, as in the systems shown in Fig. 1, while the ratio $k/k$ of the lengths of the parts into which the links 57, 58 are divided by the pivotal connections thereto of the selector elements is unity.

In both Figs. 4 and 5 there are seven combinations of armature movements of each set of magnets, viz, $1a$ and $2a$ and $3a$; $1a$ and $2a$, $1a$ and $3a$, $2a$ and $3a$; $1a$, $2a$ and $3a$ for the first set; and $4a$ and $5a$ and $6a$; $4a$ and $5a$, $4a$ and $6a$, and $5a$ and $6a$; and $4a$, $5a$ and $6a$ for the second set. It will be obvious that by the conjoint action of the two selector elements, the platen may in both instances be brought to any one of the forty-nine positions with respect to the striker.

The universal keyboard now generally in use has forty-two characters only and therefore, generally speaking, the systems shown in Figs. 4 and 5 are preferable to the system shown in Fig. 1 in which, as above stated, five oscillators are required to secure thirty-one combinations and six to get sixty-three combinations.

Figures 6, 7:
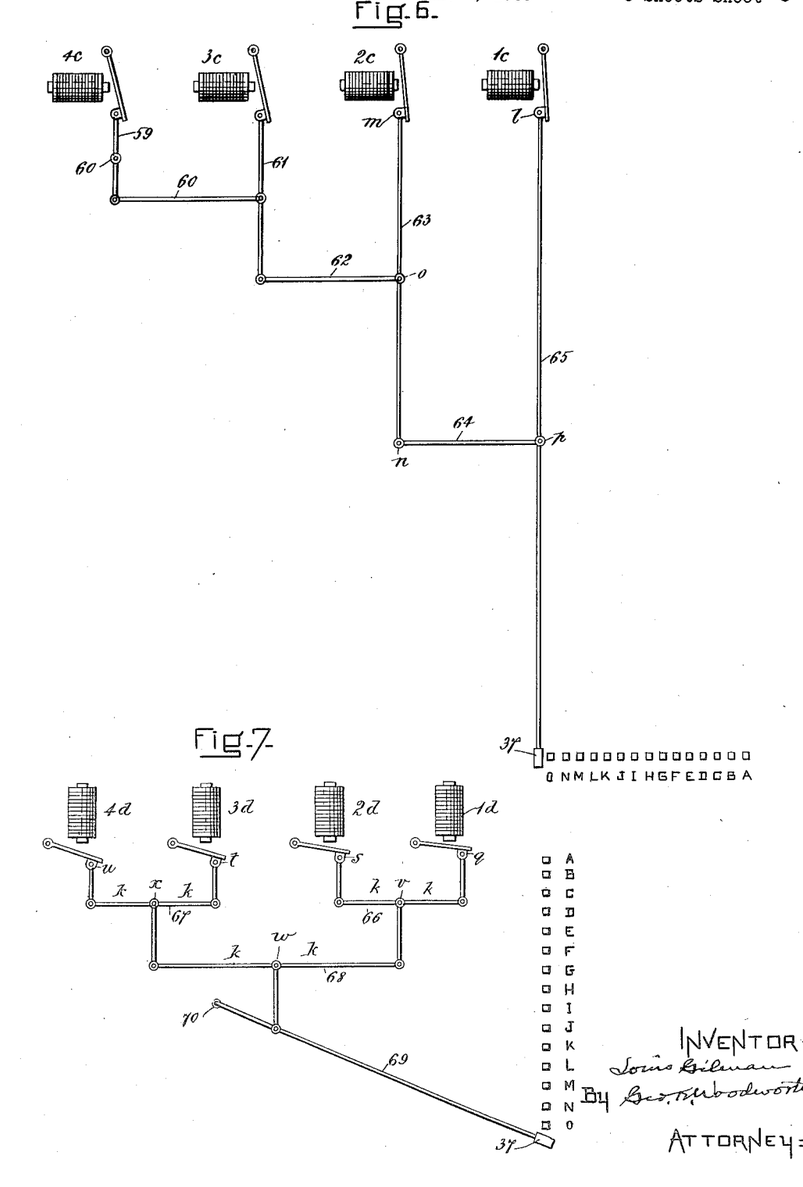
Figs. 6 and 7 are fragmentary views of further modifications in which a single selector is used.

In Fig. 6 the desired modification of the effect of the armature motions on the selector in accordance with the frequency-responsive element or combinations of frequency-responsive elements energized is secured not by means of the proportioning of the ratios of the lengths of various interconnected elements but by means of levers of progressively different lengths connected, respectively, to the magnet armatures and interconnected each to the lever following by links. To the armature of magnet $4c$ is pivoted the lever 59 having a fulcrum at 60, said fulcrum preferably being a pivot secured to a fixed support. By the link 60 the lever 59 is pivotally connected to the lever 61 which has twice the length of the lever 60 and is in turn pivotally connected to the armature of magnet $3c$. The link 62 pivotally connects the lower end of lever 61 to the middle of the lever 63 which is twice as long as the lever 61 and is pivotally connected to the armature of the magnet $2c$. The lever 63 is pivotally connected by the link 64 to the midpoint of the selector 65, one end of which is pivoted to the armature of the magnet $1c$ and the other of which carries the plate or striker head 37.

There are in this instance the same number of combinations as above set forth in connection with Fig. 1. The amplitude of movement of the point 1 at which the selector is pivoted to the armature of magnet $1c$ being $r$, it follows that when the key 6 of the transmitter shown in Fig. 1 is closed, the magnet $1c$ will be energized and the selector will move one unit of length to the letter O on the platen indicated in Fig. 6. When the key 7 is closed, the movement to the left of point $m$ will produce a like movement to the right of the point $n$, said lever 63 having its fulcrum at the point $o$, and by means of the multiplying lever 65 which when magnet $1c$ is not energized has its fulcrum at the point 1, the movement of the plate 37 is made twice that of the point $p$, which of course is equal to that of the point $n$. It follows therefore that the selector is moved over the platen two units and comes to rest over the letter N.

In like manner the energization of the magnet $3c$ will move the platen four units to the letter L and that of the magnet $4c$ will move it eight units to the letter H.

In Fig. 7 the armatures of the magnets $1d$, $2d$, $3d$, $4d$ are arranged to have successively different amplitudes of movement, the travel of the point $q$, for example, being $r$, that of the point $s$ being $2r$, that of the point $t$ being $4r$ and that of the point $u$ being $8r$. It will be understood of course that the diagram shown in Fig. 8, like the other diagrams hereof, is merely schematic and that while electromagnets of the usual type may be employed in Figs. 1 and 6, it is preferable to use solenoids in the system shown in Fig. 7. Links 66, 67 pivotally connect the armatures of the electromagnets pair by pair and the link 68 pivotally connects the links 66, 67. Preferably the pivotal connection of the link 68 to the other two and of the selector 69 to the link 68 divide each link into two equal parts $k$, $k$. It will be obvious that the linkage interposed between the magnets and the selector will so modify the effect of the motion of the armatures on the selector that the latter will be brought to various predetermined positions in accordance with the particular magnet or combinations of magnets thus energized. Thus, as before, magnet $1d$ will move the selector one unit of length, magnet $2d$ will move it two such units, $3d$ four units, and $4d$ eight units to the letter H.

This will be clear when it is noted that the movement of the point $q$ over a distance of $r$ will cause the point $v$ to move a distance of $r/2$ which in turn will cause the point $w$ to move a distance of $r/4$. If the multiplying action of the lever of the selector 69 fulcrumed at 70 is 4 to 1, the travel of the plate 37 will be $r$ and said plate will be moved one unit of length and brought over the letter O. It is to be understood of course that the unit of travel of said plate is either $r$ or a multiple thereof and that the multiplying action of the selector will depend upon the spacing of the type. The travel of the point $s$ being $2r$, the point $v$ will move a distance equal to $r$ when the magnet $2d$ is energized and the point $w$ a distance of $r/2$, which multiplied by the leverage factor of the selector, will make the movement of the plate equal to $2r$ under the assumption above set forth. The movement of the point $t$ over a distance of $4r$ will cause the point $x$ to travel a distance of $2r$ and the point $w$ a distance of $r$ which, multiplied by 4 makes the travel of the plate 37 four units and brings it over the letter L. The movement of the point $u$ a distance equal to $8r$ causes the point $x$ to move a distance of $4r$ and the point $w$ a distance of $2r$ which, multiplied by the factor 4, makes the travel of the plate 37 eight units and brings the same over the letter H.

It will be obvious in connection with Figs. 6 and 7 that the various combinations specified above in connection with Fig. 1 will move the lower end of the selector to the several letters on the indicated type platen.

Figures 8, 10:
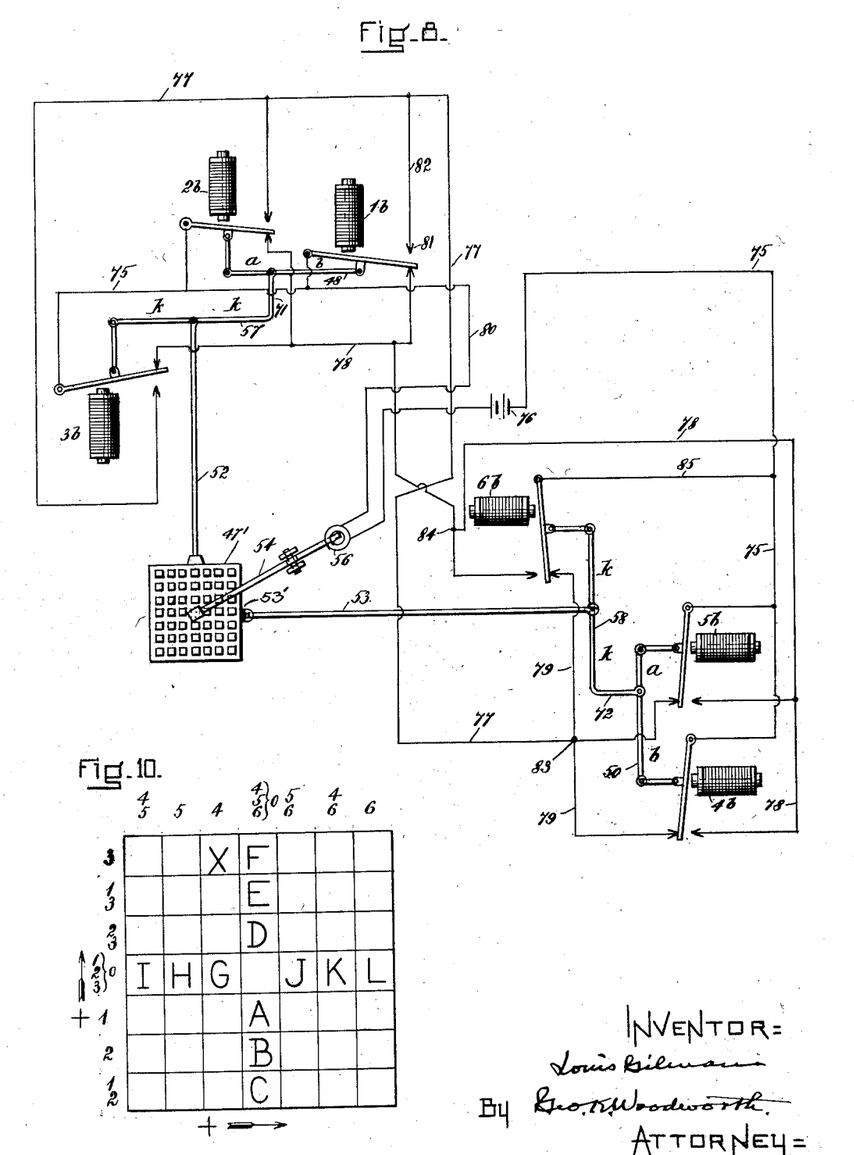
Fig. 8 is a diagram of a radio printing telegraph system provided with means for preventing the operation of the actuator by extraneous electrical forces such as static crashes.
Fig. 10 is an enlarged plan view of the type platen shown in Figs. 5, 8 and 9.

In Fig. 8 I have shown the system illustrated in Fig. 5 with a slight modification, viz, the links 57, 58 are pivoted to the links 48, 50, respectively, by short connectors 71, 72, formed integral with said links 57, 58, instead of being connected to said links 48, 50, by the links 73, 74 which are pivotally connected to the links 57, 58, respectively, as shown in Fig. 5. By this construction undue lateral movement of the linkage system is prevented.

It will be understood of course that the electromagnets shown in Figs. 4, 5, 6, 7 and 8 are connected each to a different one of the filters or other suitable frequency-responsive elements at the receiving station, as for example, by the circuit arrangement indicated in Fig. 1. In Fig. 8 a system of circuits is indicated whereby the closure of the circuit of the magnet 56 which operates the actuator or striker 54 is prevented when all of the electromagnets are energized by an extraneous electrical force such as a static crash of sufficient intensity to pass current through all of the filters. By the conductor 75 the armatures of all six magnets are connected at their pivotal points through the electric source shown as the battery 76. By the conductor 77 the front contacts of the armatures of magnets 1b, 2b, 3b are connected to the back contact of the armatures of magnets 4b, 5b and 6b. By the wire 78 the front contacts of magnets 4b, 5b, 6b are connected to the back contacts of magnets 1b, 2b, 3b. The back contacts of the magnets 4b, 5b and 6b are connected by the wire 79. It will be obvious that by the connections of armatures and back and front contacts the circuit of the source 76 through the actuator magnet cannot be closed when all three armatures of both sets are on their front contacts, and also that said circuit will be closed when any magnet or combinations of magnets of one set is energized, if no magnet or one, two or all magnets of the second set are energized. For example, if magnet 1 is energized the circuit of the source 76 may be traced as follows: From the positive pole of said source through magnet 56 and then by conductor 80 to the armature of magnet 1b which is now on its front stop 81, and thence by lead 82 and conductor 77 to the back stops of magnets 4b, 5b, 6b, and thence back to said source by conductor 75. As will be obvious, if magnets 5b and 1b are energized simultaneously the armature of magnet 5b will not form a part of the path aforesaid and the current will pass from the juncture 83 to the lead 79, the back-stops of magnets 4b, 5b, 6b, and thence to the source 76 via conductor 75. It will be obvious also that if magnets 4b, 5b and 6b are all energized simultaneously with magnet 1b, the path of the current through the magnet 56 will be as above traced up to the juncture 84, from which point the circuit will be completed by way of the front stop of magnet 6b, the armature of said magnet, the lead 85 and conductor 75. When, however, all six magnets are energized the circuit of the actuator magnet will be opened at the back contacts of the magnets 4b, 5b and 6b.

As hereinafter explained, the simultaneous energization of all six electromagnets by transmitted signal impulses produces no movement of the platen, but unless means were employed to prevent the actuation of the striker when the six magnets simultaneously are energized, the paper or record sheet which is moved step by step after each blow of the striker by mechanism associated therewith and well understood by those skilled in the art, would move forward one space and thus leave a blank in the middle of a word.

Figure 9:
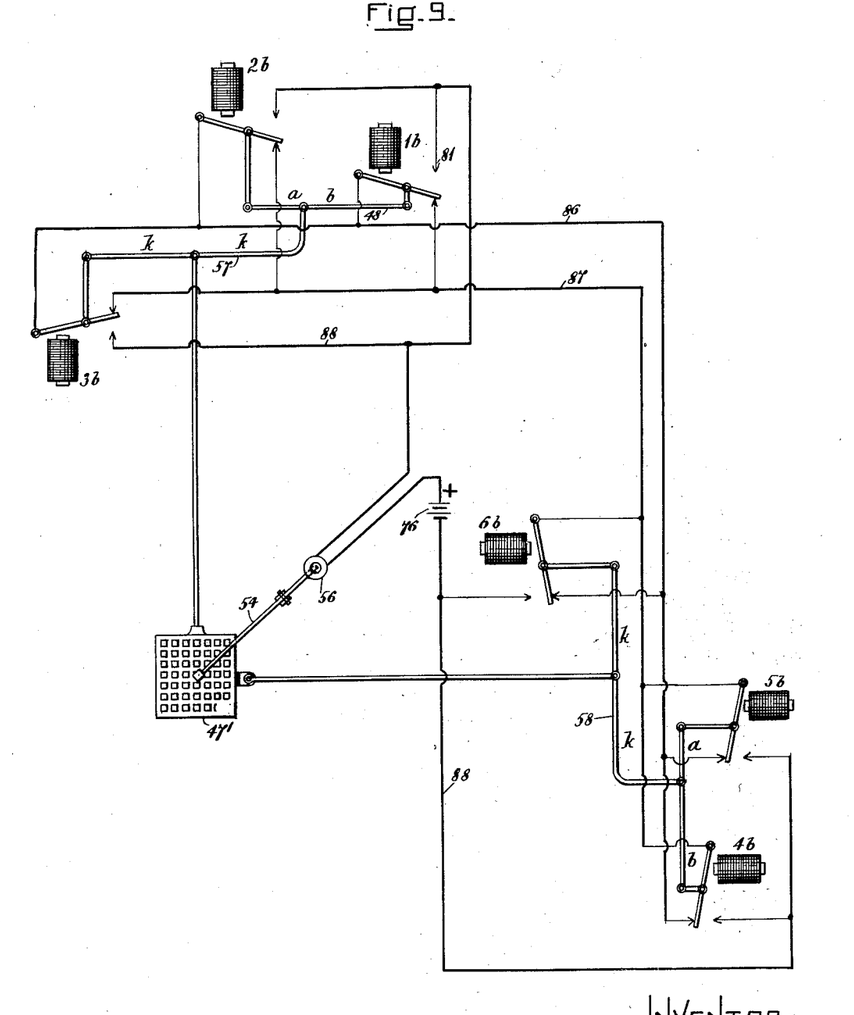
Fig. 9 is a diagram of a modification.

By means of the system shown in Fig. 9, which is the preferred form of my invention, an additional security against static and other interference is obtained. In order more fully to explain the operation of this system, it will be necessary to revert again to Fig. 5. I have already explained that both in Figs. 4 and 5 there are seven possible combinations of armature movements of both sets of magnets but it will be noted that in Fig. 5, as well as in Figs. 8 and 9 one magnet of each set, viz, 3b and 6b, is directed oppositely to the other two and that therefore the movement of the selector elements effected by the armatures of magnets 3b and 6b is negative with respect to the direction of motion of said selector elements when acted upon by the other two magnets of each set. The combinations effecting the forty-nine positions of the platen will readily be understood from Fig. 10 in which six spaces of the middle row and the middle column are provided with letters and the numbers at the head of each column and at the left of each row indicate the magnets and combinations of magnets which when energized select the letters of said middle row and middle column.

The several magnets are designated in Fig. 5 as 1b, 2b, etc., but for convenience of representation of the letter "b" has been omitted from each of the numbers in Fig. 10.

If magnet 1b only is energized the platen is moved along its support one space in the direction of the arrow at the left of Fig. 10 so that the letter A will be brought under the striker. Assuming, as in the case of the systems already described, that the amplitude of movement of the point of pivotal connection of the linkage system with each armature is $r$, it will be seen that the movement of the armature of magnet 1b will cause the point $y$ to move a distance equal to $\frac{1}{3}r$ and that the point $z$ will travel a distance equal to $\frac{1}{3} \times \frac{1}{2}r$ or $\frac{1}{6}r$. The unit of travel therefore of the platen in the direction of the arrow at the left of Fig. 10 or in the opposite direction, or in the direction of the arrow below said figure, or in the opposite direction, will be equal to $\frac{1}{6}r$. The type platen is approximately 1" square and therefore, although magnets of the type indicated in Fig. 5 may be used, it is preferably to employ solenoids in order to secure the necessary motion without excessive expenditure of energy.

Magnet 2b acting alone will move the pivotal point $y$ a distance of $\frac{2}{3}r$ and the point $z$ a distance of $\frac{2}{3} \times \frac{1}{2}r$ or $2/6r$ so that the platen will move in the direction of the lefthand arrow on Fig. 10 a distance of two units and the letter B will be brought under the striker.

The energization of magnets 1b and 2b will move the point $y$ over a distance $r$ and the point $z$ a distance of $\frac{1}{2}r$ or $3/6r$, thereby bringing the letter C under the striker.

When the magnets 1b, 2b and 3b alone are energized simultaneously no movement will be imparted to the platen for the reason that the magnets 1b and 2b will move the point z in the direction of the lefthand arrow of Fig. 10 a distance equal to ½r as already explained, while the magnet 3b will move said point the same distance in the opposite direction, with the result of course that the platen remains stationary with the blank space at the intersection of the middle row and the middle column under the striker.

When the magnets 2b and 3b are energized together, the resultant effect on the platen will be as follows: The magnet 2b will move the point y over a distance of ⅔r and the point z a distance of ⅔×½r or ⅓r in the direction of the lefthand arrow, while the magnet 3b will move said point z a distance ½r or 3/6r in the opposite direction, with the result that said platen will move −⅙r or one unit in the direction opposite that indicated by the lefthand arrow, thereby bringing the letter D under the striker. Similarly, the energization of the magnets 1b and 3b will cause the point z to move ⅓×½r−½r=−2/6r, or two units of distance in the direction opposite the left-hand arrow, thereby bringing the letter E under the striker.

Magnet 3b acting alone will move the point z over a distance of −½r or −3/6r or three units in the direction opposite that of the lefthand arrow, thereby bringing the letter F under the striker.

From the foregoing it will be readily understood that the energization of the magnets and combinations thereof indicated at the top of Fig. 10 will move the platen in the direction of the arrow below said figure to bring the letters G, H and I under the striker, and in the opposite direction to bring the letters J, K, L under said striker. It will be clear that the conjoint action of the magnets or combinations thereof indicated at the left of Fig. 10, with the magnets or combinations indicated at the top of said figure, will cause the platen so to move as to bring the remaining thirty-six squares under the striker. For example, the conjoint action of magnets 2b and 3b of the first set with magnet 4b of the second set will bring the letter X under the striker.

The system shown in Fig. 5 can be incorporated in radio or land-wire systems in various ways to minimize the effect of static and other interference. In Fig. 8 I have shown a system of wiring whereby the striker is rendered ineffective when all the magnets are energized by an extraneous electric force. However, such force might conceivably cause the passage of current through one filter or a combination of filters without effecting the energization of all six magnets, in which case a false signal would result, or if the selector mechanism were used to control a distance apparatus such as a torpedo, an undesired movement would be imparted to the latter.

The preferred form of my invention therefore consists in an arrangement of wiring whereby the circuit of the actuator will remain open unless at least one of the filters of both sets is energized and will remain open also when all of the filters of both sets are energized, thereby eliminating the effect of a static crash on the system.

Referring to Fig. 9 which shows the preferred embodiment of my invention, the armatures of magnets 1b, 2b, 3b are all connected by the conductor 86 to the back contacts of magnets 4b, 5b and 6b. The armatures of magnets 4b, 5b and 6b are all connected by conductor 87 to the back contacts of the magnets of the first set. The front contacts of all six magnets are connected by the conductor 88 through the source 76 and the magnet 56 of the actuator. It follows therefore that if any magnet or combination of magnets of the first set alone is energized, the circuit through the actuator magnet will be open at the front contacts of the magnets of the second set and, conversely, but if any magnet or combination of magnets of the first set is energized simultaneously with any magnet or combination of magnets of the second set, the circuit of the actuator magnet will be closed at the front contact of at least one magnet of the second set, and conversely. For example, if magnet 1b alone is energized, the circuit of the actuator magnet may be traced from the positive pole of the source through the actuator magnet to the conductor 88, front contact 81, armature of magnet 1b to conductor 86 and thence to the back contacts of the magnets of the second set, or from the point of connection of the armature of magnet 1b with conductor 86 to the armature of magnet 3b and thence via conductor 87 to the armatures of the second set, each of which is against its back contact. The battery circuit being connected by conductor 88 to the front contacts of the magnets of the second set, it follows that there will be no circuit through the actuator magnet. If, however, one or more magnets of the second set be actuated simultaneously with magnet 1b, the conductor 87 will be connected with conductor 88 through the armature or armatures of the magnet or magnets of the second set which are energized and the circuit of the actuator magnet will be closed at the front contact or contacts of the magnet or magnets of the second set so energized. Similarly, if the magnet 4b is energized the source will be connected through the conductor 88 and the front contact of said magnet to the armature thereof and the conductor 87, but as the armature of the first set are all on their back contacts, the circuit of the actuator magnet will be open at the front contacts of said armatures. If, however, any magnet or combination of the same in the first set is energized, the circuit of the actuator magnet will be closed in the following manner: If magnet 1b is energized the path will be from the conductor 87 to the back contacts of magnets 2b and 3b, thence through the armatures of the last-mentioned magnets to the conductor 86, the armature of magnet 1b, the front contact of said magnet and thence through the actuator magnet to the other pole of the source. If magnet 3b is energized, the circuit will be from the conductor 87 to the back contacts of the armatures of magnets 1b and 2b through said armatures and the conductor 86 to the armature of magnet 3b and thence back to the source through the front contact thereof and the conductor 88. It follows as of course that if all six magnets are energized simultaneously, the circuit of the actuator magnet will be open at the back contacts of all the magnets.

Refering to Fig. 10, the character 0 is placed opposite the bracket enclosing the combinations 1, 2, 3 and 4, 5, 6. As above explained, the simultaneous energization of magnets 1b, 2b, 3b and of magnets 4b, 5b, 6b will produce no movement of the platen. The 0 of Fig. 10 may therefore indicate that no magnet of either set is energized, or that all of the magnets of either set are energized. There are thus four combinations which will produce zero movement of the platen, viz, 0—0; 0—4, 5, 6; 0—1, 2, 3; 1, 2, 3,—4, 5, 6. By means of the system shown in Fig. 9 the following combinations are rejected, viz, 0—1; 0—2; 0—1, 2; 0—1, 2, 3; 0—2, 3; 0—1, 3; 0—3 for the magnets of the first set and 0—4; 0—5; 0—4, 5; 0—4, 5, 6; 0—5, 6; 0—4, 6; 0—6 for the magnets of the second set.

Each of the aforesaid combinations, with the exception of the two which involve all three magnets of each set, will produce a movement of the platen, as above described in connection with Fig. 10, but in each case the circuit of the actuator will be open so that said movement will be ineffective. The two combinations involving all three magnets of each set result in no movement of the platen and in such case also the circuit of the actuator magnet will remain open. Therefore in order to effect the selections of the letters in the middle column of the platen A, B, C, D, E, F, it is necessary not only to energize the magnets and combinations of the first set indicated at the left of said figure, but also simultaneously to energize the magnets 4, 5 and 6 of the second set, as otherwise no imprint of the selected letter will be made by the actuator. Similarly, in order to effect the co-operation of the striker with the platen when the letters G, H, I, J, K, L of the middle row have been selected, it is necessary not only to energize the magnets and combinations of magnets of the second set indicated at the top of Fig. 10, but also simultaneously to energize the magnets 1, 2 and 3 of the first set.

Having thus described illustrative embodiments of my invention without however limiting myself thereto, what I claim and desire to secure by Letters Patent is:

1. An electrical control apparatus comprising in combination, a plurality of frequency-responsive elements, two sets of electromagnetically operable mechanisms, each of said mechanisms being associated with a different one of said elements and said sets being arranged substantially in quadrature, each said set having a plurality of said mechanisms, means arranged for movement by the conjoint action of said electromagnetically-operable mechanisms, an electromagnetic actuator disposed for co-operation with said means, a circuit for said electromagnetic actuator, and means for preventing the closure of said circuit when all of said frequency-responsive elements are energized.

2. An electrical control apparatus comprising in combination, two sets of electrical magnets arranged in quadrature, each set comprising two electromagnets placed side by side and extending in a given direction and a third oppositely-disposed electromagnet placed forwardly of the two first-mentioned electromagnets and extending in the opposite direction, means arranged for movement by the conjoint action of said electromagnets, an electromagnetic actuator arranged for co-operation with said means, and means permitting the operation of said actuator only when at least one of the electromagnets of both sets is energized.

3. An electrical control apparatus comprising in combination, a plurality of frequency-responsive elements, two sets of electromagnetically operable mechanisms, each of said mechanisms being associated with a different one of said elements and said sets being arranged substantially in quadrature, means arranged for movement by the conjoint action of said electromagnetically-operable mechanisms, an electromagnetic actuator disposed for co-operation with said means, and means permitting the operation of said actuator only when at least one of the electromagnets of both sets is energized.

4. An electrical control apparatus comprising in combination, two sets of frequency-responsive elements, two sets of electromagnetically operable elements, each of said mechanisms being associated with a different one of said elements and said sets being arranged substantially in quadrature, means arranged for movement by the conjoint action of said electromagnetically-operable mechanisms, an electromagnetic actuator disposed for co-operation with said means, and means permitting the operation of said actuator only when at least one of said frequency-responsive elements of both sets is energized.

5. An electrical control apparatus comprising in combination, two sets of frequency-responsive elements, two sets of electromagnetically-operable mechanisms, each of said mechanisms being associated with a different one of said elements and said sets being arranged substantially in quadrature, means arranged for movement by the conjoint action of said electromagnetically operable mechanisms, an electromagnetic actuator arranged for co-operation with said means, a circuit for said electromagnetic actuator, and means for preventing the closure of said circuit unless at least one of said frequency-responsive elements of both sets is energized.

6. An electrical control apparatus comprising in combination, a plurality of frequency-responsive elements, two sets of electromagnetically-operable mechanisms, each associated with a different one of said elements, at least one of said sets having a plurality of said mechanisms, means arranged for movement by the conjoint action of said electromagnetically operable mechanisms, an electromagnetic actuator disposed for co-operation with said means, a circuit for said electromagnetic actuator, and means for preventing the closure of said circuit when all of said frequency-responsive elements are energized.

7. An electrical control apparatus comprising in combination, a plurality of frequency-responsive elements, a plurality of electromagnetically-operable mechanisms, each associated with a different one of said elements, means arranged for movement by the conjoint action of said electromagnetically-operable mechanisms, an electromagnetic actuator disposed for co-operation with said means, and means permitting the operation of said actuator only when at least one of the electromagnets of both sets is energized.

8. An electrical control apparatus comprising in combination, a plurality of frequency-responsive elements arranged in two sets, a plurality of electromagnetically-operable mechanisms, each associated with a different one of said elements, means arranged for movement by the conjoint action of said electromagnetically-operable mechanisms, an electromagnetic actuator disposed for co-operation with said means, a circuit for said electromagnetic actuator, and means for preventing the closure of said circuit when all of said frequency-responsive elements are energized and for permitting the closure of the same only when at least one of said frequency-responsive elements of both sets is energized.

9. An electrical control apparatus comprising in combination, a plurality of frequency-responsive elements, two sets of electromagnetically operable mechanisms, each of said mechanisms being associated with a different one of said elements and said sets being arranged substantially in quadrature, a rectangular type platen arranged for movement by the conjoint action of said electromagnetically-operable mechanisms, said platen having a blank at the center thereof, and an electromagnetic actuator disposed for co-operation with said platen, said actuator resting on said blank when said platen is in normal position.

10. An electrical control apparatus comprising in combination, a plurality of frequency-responsive elements, a plurality of electromagnetically-operable mechanisms, each associated with a different one of said elements, a rectangular platen having a blank at the center thereof and arranged for movement by the conjoint action of said electromagnetically-operable mechanisms, such movement being substantially in one plane, and an electromagnetic actuator disposed for co-operation with said platen, said actuator resting on said blank when said platen is in normal position.

11. An electrical control apparatus comprising in combination, a plurality of frequency-responsive elements, a plurality of electromagnetically-operable mechanisms, each associated with a different one of said elements, means arranged for movement by the conjoint action of said electro-magnetically-operable mechanisms, an electromagnetic actuator arranged for co-operation with said means, a circuit for said actuator, and means for closing said circuit automatically by the energization of two of said mechanisms.

12. An electrical control apparatus comprising in combination, two sets of frequency-responsive elements, a plurality of electromagnetically-operable mechanisms, each associated with a different one of said elements, means arranged for movement by the conjoint action of said electromagnetically-operable mechanisms, an electro-magnetic actuator arranged for co-operation with said means, a circuit for said actuator, and means for closing said circuit automatically only by the simultaneous energization of at least one of said mechanisms of both of said sets.

13. An electrical control apparatus comprising in combination two sets of frequency-responsive elements, two sets of electromagnetically-operable mechanisms, each of said mechanisms being associated with a different one of said elements and said sets being arranged substantially in quadrature, front and back contacts for each of said mechanisms of both sets, means arranged for movement by the conjoint action of said electromagnetically-operable mechanisms, an electromagnetic actuator arranged for co-operation with said means, a normally open circuit for said actuator, said circuit being connected to the front contacts of all of said mechanisms of both of said sets, a circuit connecting the back contacts of all of said mechanisms of one of said sets to the armatures of all of said mechanisms of the second of said sets, and a circuit connecting the back contacts of all of said mechanisms of the second of said sets to the armatures of all of said mechanisms of the other of said sets.

LOUIS GILMAN.